(12) United States Patent
Buell et al.

(10) Patent No.: US 6,213,238 B1
(45) Date of Patent: Apr. 10, 2001

(54) MOTORCYCLE SPROCKET ASSEMBLY

(75) Inventors: Erik F. Buell, Mukwonago; John G. Goeb, Jr., Waukesha, both of WI (US)

(73) Assignee: Buell Motorcycle Company, East Troy, WI (US)

( * ) Notice: Subject to any disclaimer, the term of this patent is extended or adjusted under 35 U.S.C. 154(b) by 0 days.

(21) Appl. No.: 09/365,311

(22) Filed: Jul. 30, 1999

(51) Int. Cl.$^7$ ................................................. B62D 61/02
(52) U.S. Cl. ............................................. 180/219; 474/152
(58) Field of Search .................................. 180/231, 219; 280/261; 29/893, 893.1, 893.3, 893.32; 474/152, 165; 72/126

(56) References Cited

U.S. PATENT DOCUMENTS

| | | | |
|---|---|---|---|
| 338,961 | * | 3/1886 | Hart ..................................... 29/893.3 |
| 1,181,175 | * | 5/1916 | Sharpiro ................................ 474/151 |
| 2,679,089 | * | 5/1954 | Opitz et al. ............................ 72/126 |
| 3,318,408 | * | 5/1967 | Hopkins ................................. 180/230 |
| 3,416,385 | * | 12/1968 | Schenk ................................... 474/152 |
| 3,552,166 | * | 1/1971 | Percival .................................. 72/58 |
| 3,717,017 | * | 2/1973 | Vukovich ................................ 72/68 |
| 3,745,851 | * | 7/1973 | Zeldman et al. ....................... 74/434 |
| 4,280,264 | * | 7/1981 | Negrich ................................. 29/159.2 |
| 4,487,535 | * | 12/1984 | Johnson et al. ........................ 409/60 |
| 4,677,870 | * | 7/1987 | Alshareedah ........................... 74/431 |
| 4,794,998 | * | 1/1989 | Iwai et al. ............................. 180/219 |
| 4,878,370 | * | 11/1989 | Fuhrman et al. ....................... 72/264 |
| 4,945,783 | * | 8/1990 | Grob ..................................... 74/460 |
| 4,946,427 | * | 8/1990 | Rampe .................................. 474/161 |
| 5,221,236 | * | 6/1993 | Raymer et al. ....................... 474/109 |
| 5,392,517 | * | 2/1995 | Lyon et al. ........................... 29/893.36 |
| 5,711,187 | * | 1/1998 | Cole et al. ............................. 74/434 |
| 5,992,587 | * | 11/1999 | Maldonado ........................... 188/344 |

OTHER PUBLICATIONS 1993 and 1994 1340 Models Parts Catalog, p. 60.
1999 Custom Chrome Catalog, pp. 13.32 and 13.33.
1997 J&P Cycles, pp. 9–5, 9–6, and 9–20.
1993 Uniquely V–Twin Manufacturing Catalog, p. 144.

* cited by examiner

*Primary Examiner*—Douglas Hess
*Assistant Examiner*—Michael Cuff
(74) *Attorney, Agent, or Firm*—Michael Best & Friedrich LLP

(57) ABSTRACT

A motorcycle includes a rear wheel sprocket assembly made by drawing a piece of material into a ring-shaped part having a flange portion, and roll-forming teeth into the flange portion. An optional insert member may be mounted within the ring-shape part to provide a rim around the flange.

11 Claims, 4 Drawing Sheets

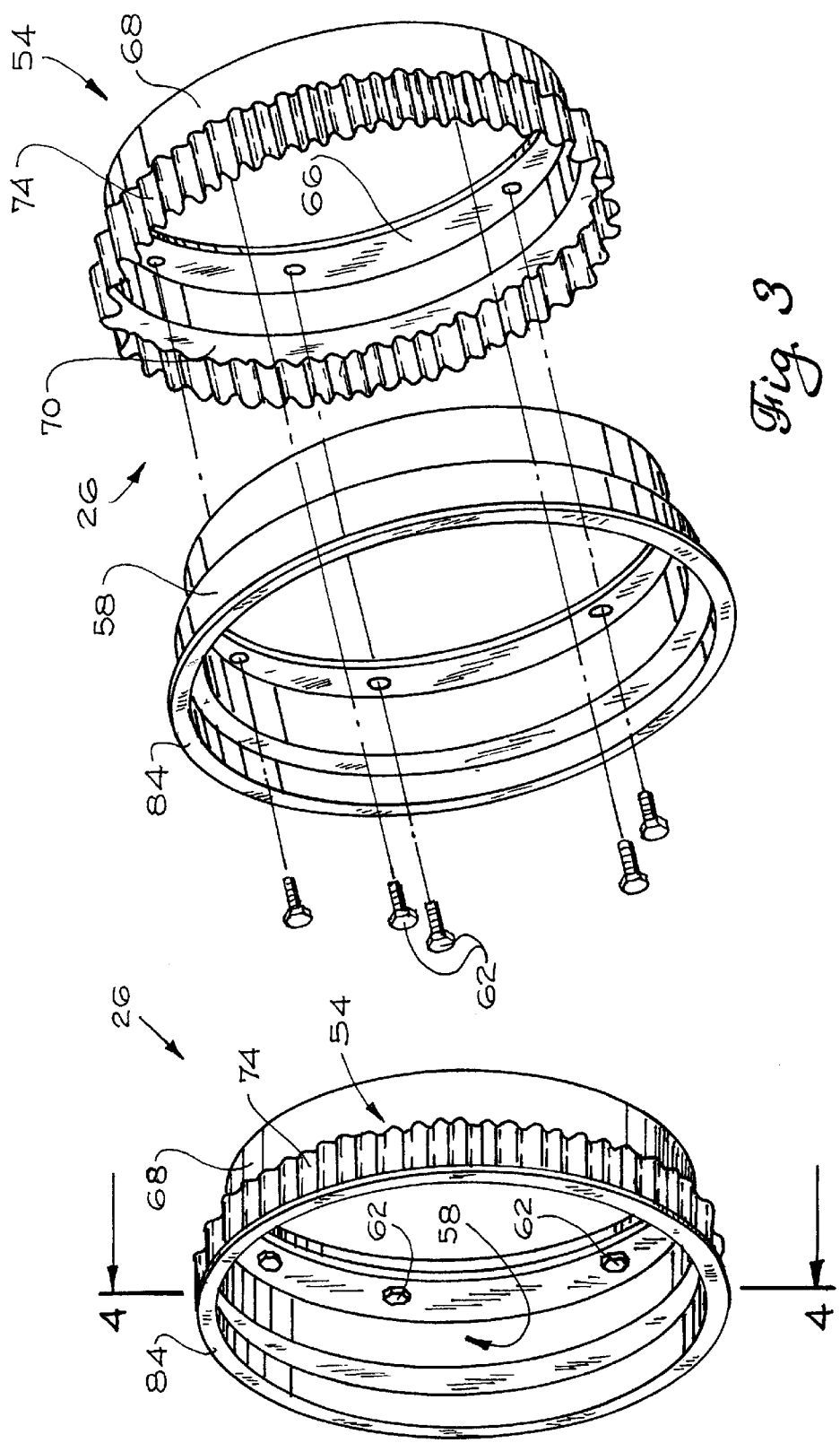

MOTORCYCLE SPROCKET ASSEMBLY

FIELD OF THE INVENTION

The invention relates to a rear wheel sprocket assembly for a motorcycle or other two-wheeled vehicle. More specifically, the invention relates to a method for making the sprocket assembly.

BACKGROUND

Two-wheeled powered vehicles, such as motorcycles, typically include a driven sprocket mounted on one of the wheels, usually the rear wheel. The sprocket typically includes a flange that is mounted for rotation with the wheel, and a toothed portion mounted to the flange. The toothed portion includes teeth for the transmission of power from a drive member, such as a chain or belt, to the rear wheel. Known driven sprockets are commonly made by high-pressure die casting, molding with a permanent mold, or machining from a solid block.

SUMMARY

The present invention provides a method for manufacturing a motorcycle including the steps of providing a frame, interconnecting front and rear wheels with the frame for rotation, mounting an engine and a transmission to the frame, manufacturing a rear wheel drive sprocket assembly, mounting the sprocket assembly to the rear wheel, and interconnecting the sprocket assembly with an output shaft of the transmission with a flexible drive member. The step of manufacturing the rear wheel drive sprocket includes making a toothed member by providing a piece of material, shaping the piece of material into a generally ring-shaped part having at least one flange, and deforming a portion of the part to create teeth.

The ring-shaped part may be made, for example, by performing a drawing process on the piece of material, and the teeth may be made, for example, by roll-forming. The manufacturing step may also include providing an insert having a rim portion, and mounting the insert at least partially within the toothed member such that the rim portion is positioned adjacent the teeth.

The present invention provides several advantages over known driven sprockets and methods for making driven sprockets. The present invention may result in a lower manufacturing cost, a driven sprocket having lower weight, and the ability to make sprockets of various size using the same roll-forming equipment. Other features and advantages of the invention will become apparent to those skilled in the art upon review of the following detailed description, claims, and drawings.

BRIEF DESCRIPTION OF THE DRAWINGS

FIG. 2 is a perspective view of the sprocket assembly.

FIG. 3 is an exploded view of the sprocket assembly.

Figure 1:
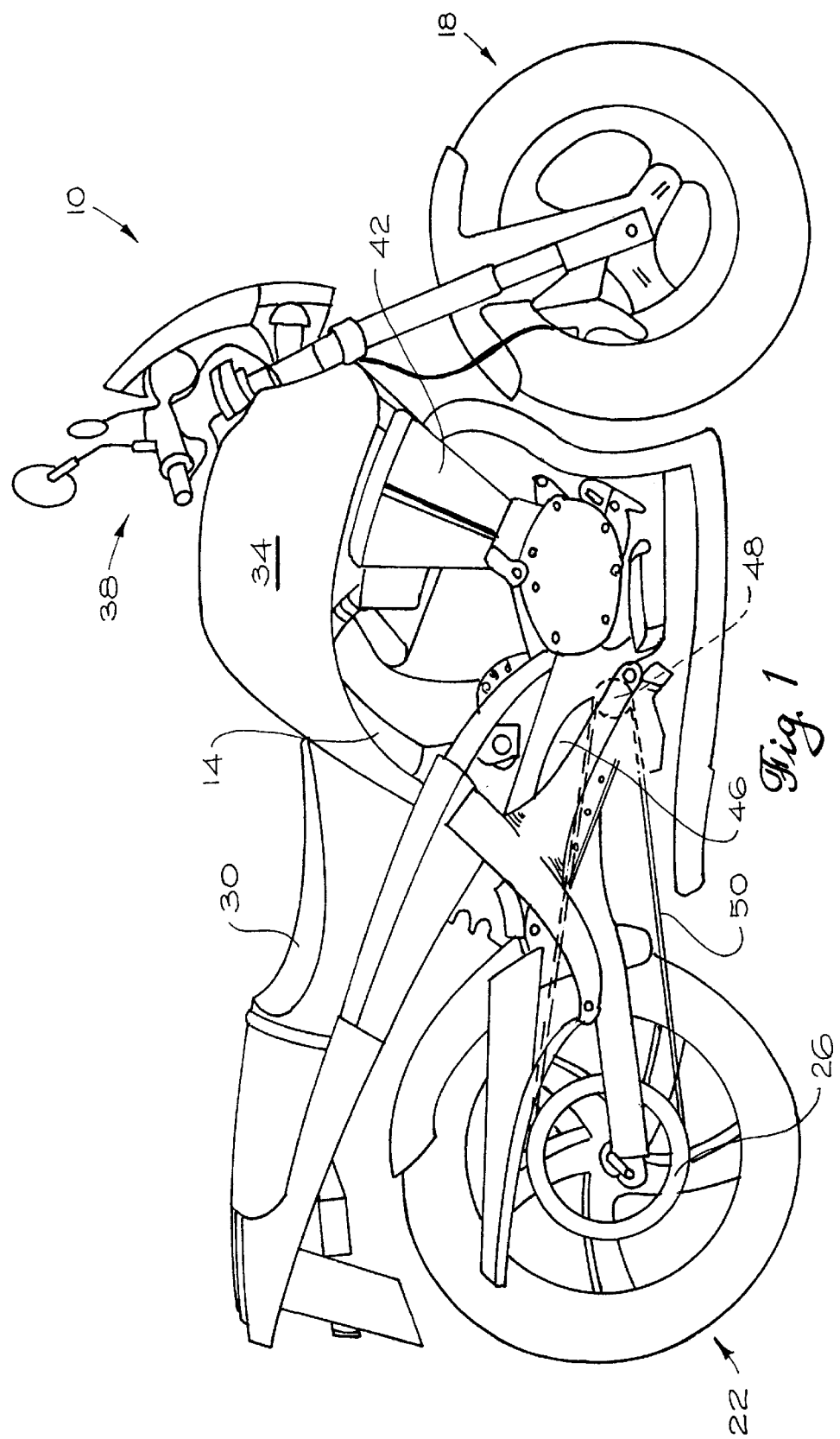
FIG. 1 is a right-side elevational view of a motorcycle embodying the present invention.
Figure 4:
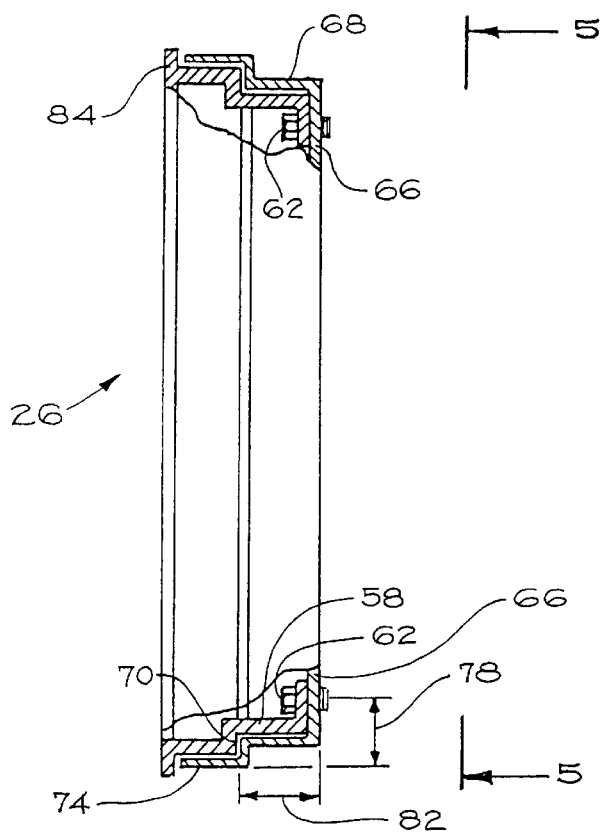
FIG. 4 is a cross-section view taken along line 4—4 in FIG. 2.
Figure 5:
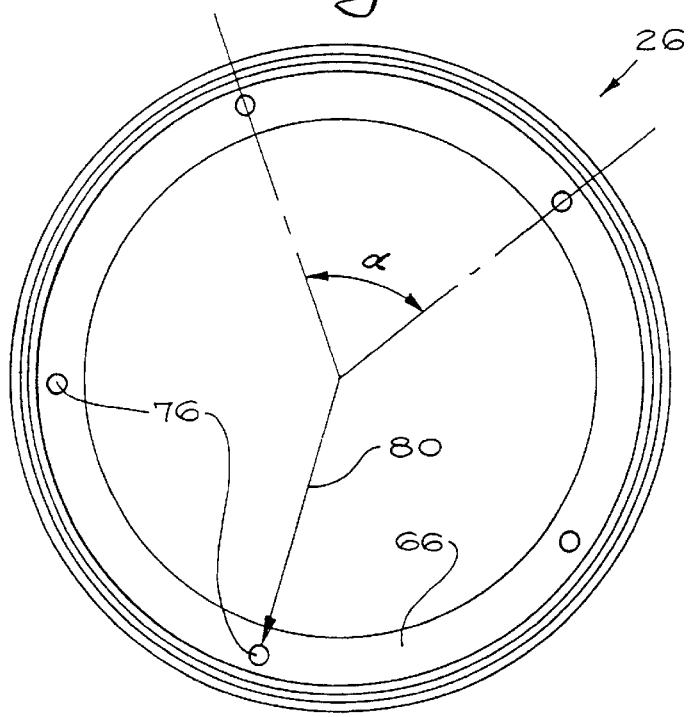
FIG. 5 is a side elevational view of the sprocket assembly taken along line 5—5 in FIG. 4.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter. The use of letters to identify steps of a method or process is simply for identification and is not meant to indicate that the steps should be performed in a particular order.

DETAILED DESCRIPTION

FIG. 1 illustrates a motorcycle 10 including a frame 14, front and rear wheel assemblies 18, 22, a rear wheel drive sprocket assembly 26 mounted on the rear wheel assembly 22, a seat 30, a fuel tank 34, a steering assembly 38, an engine 42, a transmission 46 including an output shaft 48, and a flexible drive member 50 (e.g., a chain or belt) interconnecting the output shaft 48 with the sprocket assembly 26. The engine 42 provides a rotating crankshaft (not shown) that drives the output shaft 48. The output shaft 48 in turn drives the rear wheel assembly 22 through the drive member 50 and the sprocket assembly 26 to propel the motorcycle 10. In the illustrated embodiment, the drive member 50 is a belt.

Turning now to FIGS. 2–5, the sprocket assembly 26 includes a toothed member 54 having teeth for engaging the drive member 50, and an optional insert member 58 mounted together with fasteners 62. The toothed member 54 includes a flange 66 accommodating the fasteners 62, a spacer portion 68, a stepped portion 70 spaced from and surrounding the flange 66, and a toothed portion 74.

Apertures 76 are radially spaced apart at angles α of about 72° around the flange 66 in the illustrated embodiment. The apertures 76 are spaced a distance 78 (FIG. 4) less than about 3 inches, and preferably less than about 1.25 inches, radially inwardly from the teeth of the sprocket assembly 26. Thus, the apertures 76 are spaced at a relatively large radius 80 (FIG. 5) from the center of the sprocket assembly 26, and a relatively small distance 78 from the teeth. Torque is thought to be more effectively transmitted from the drive member 50 to the rear wheel assembly 22 due to the relatively small moment arm between the teeth and the apertures 76 and fasteners 62. The toothed portion 74 in the illustrated embodiment is longitudinally spaced from the flange 66 a distance 82 (FIG. 4) to position the toothed portion 74 in line with a sprocket (not shown) on the output shaft 48. The illustrated distance 82 is less than about 3 inches, and preferably less than about 1.25 inches.

The insert member 58 of the illustrated sprocket assembly 26 mirrors the shape of the toothed member 54, and includes a rim 84. The rim is positioned adjacent the teeth, and acts as a cap at the outer end of the toothed portion 74. The rim 84 may extend radially outwardly of the teeth. The insert member 58 is preferably constructed of plastic, but may be made of any suitable material. The rim 84 may optionally be formed as part of the toothed member 54 itself, in which case the insert member 58 would not be used. Alternatively, the sprocket assembly 26 may include the toothed member 54 without the insert member 58 or rim 84. Also, the rim 84 portion of the insert member 58 may be provided without the rest of the insert member 58, and may be affixed to the toothed member 54 by staking, welding, or any other suitable mechanical fastening means.

Figure 6:
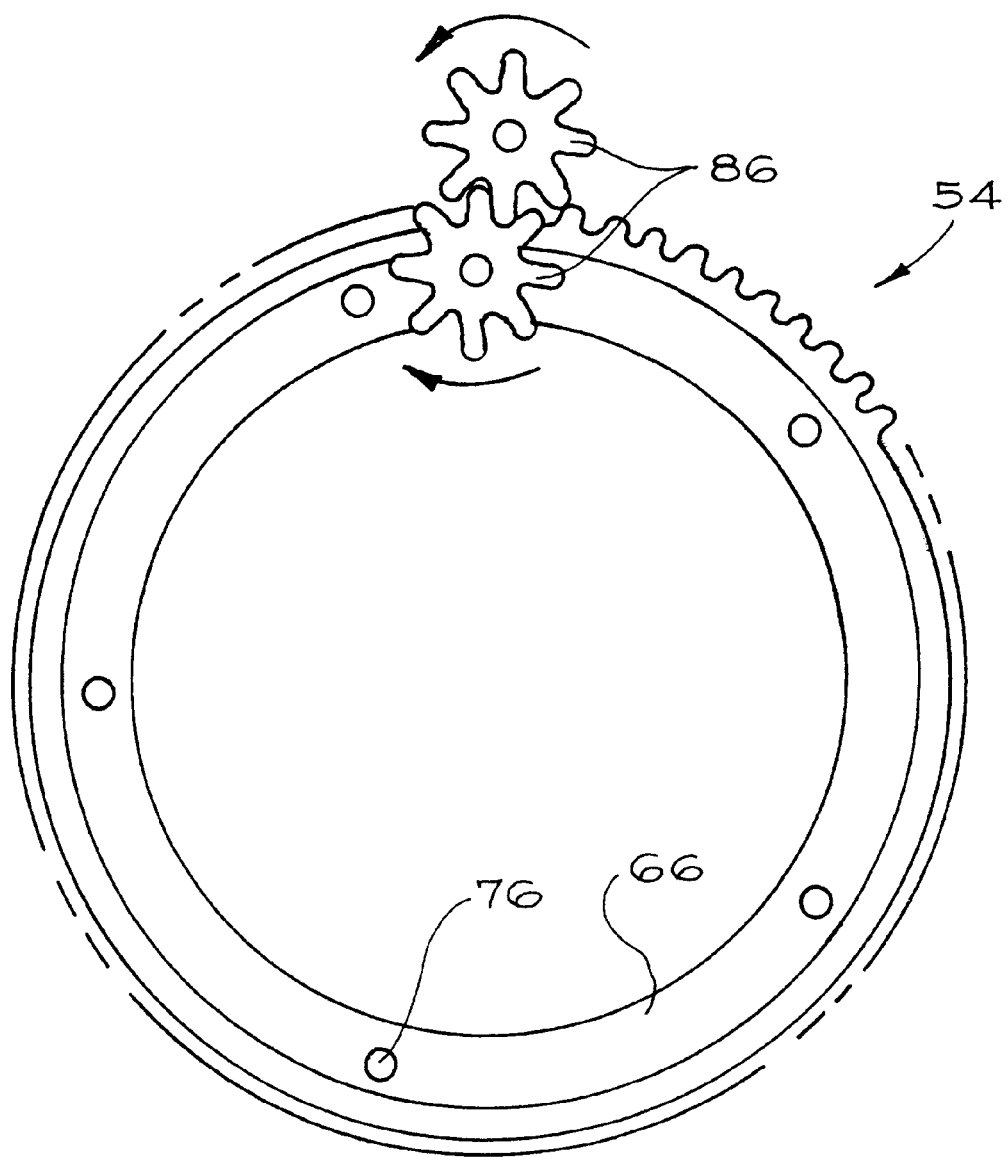
FIG. 6 is a schematic illustration of the teeth-forming step.

The sprocket assembly 26 is made by first providing a blank. The blank is preferably made of aluminum, steel, or any other suitable material. The blank is shaped into a ring-shaped part including the flange 66, spacer portion 68, stepped portion 70, and toothed portion 74 (without the teeth). Preferably, the blank is shaped by a drawing process. Then the teeth are formed into the toothed portion 74 of the ring-shaped piece by deforming the toothed portion 74, resulting in the toothed member 54 as illustrated. The teeth may be roll-formed with a pair of rollers 86, for example, as shown schematically in FIG. 6. The insert member 58 may be an integral part of the sprocket blank, or may be a separate piece formed by any suitable method (e.g., drawing, injection molding, etc.). If the insert member 58 is a separate piece, as illustrated, it is inserted into the toothed member 54. The fasteners 62 are used to hold the sprocket assembly 26 together and to mount the sprocket assembly 26 to the rear wheel assembly 22.

What is claimed is:

1. A method for manufacturing a motorcycle, the method comprising the steps of:

providing a frame, front and rear wheel assemblies, an engine, a transmission having an output shaft, and a flexible drive member;

interconnecting the front and rear wheel assemblies with the frame for rotation with respect to the frame;

mounting the engine and transmission to the frame;

manufacturing a rear wheel drive sprocket assembly by shaping a piece of material into a generally ring-shaped part having a toothed portion with a substantially smooth peripheral surface, positioning a first toothed roller within the ring-shaped part and a second toothed roller outside of the ring-shaped part such that the teeth of the first and second rollers substantially mesh, and such that the substantially smooth peripheral surface is pinched between the rollers, and roll-forming teeth into the substantially smooth peripheral surface of the toothed portion by rotating the first and second toothed rollers in substantially meshing relationship with each other;

mounting the sprocket assembly to the rear wheel assembly; and interconnecting the sprocket assembly with the output shaft of the transmission with the flexible drive member.

2. The method of claim 1, further comprising the steps of:

providing an insert member having a rim portion; and positioning the rim portion adjacent the teeth.

3. The method of claim 2, further comprising the step of mounting the insert member at least partially within the toothed member such that the rim portion is positioned adjacent the teeth.

4. The method of claim 1, further comprising the steps of:

providing an insert member substantially mirroring the shape of the ring-shaped member; and fastening the insert member to the toothed member.

5. The method of claim 1, wherein said shaping step includes drawing the piece of material into the generally ring-shaped part.

6. The method of claim 1, further comprising the steps of forming a flange in the part, and coupling the flange to the rear wheel assembly.

7. The method of claim 6, further comprising the steps of forming a spacer portion between the flange and the toothed portion such that the toothed portion is spaced from the flange less than about three inches.

8. The method of claim 6, further comprising the steps of forming a spacer portion between the flange and the toothed portion such that the toothed portion is spaced from the flange less than about 1.25 inches.

9. The method of claim 6, further comprising the step of forming apertures in the flange spaced radially less than about three inches from the toothed portion.

10. The method of claim 6, further comprising the step of forming apertures in the flange spaced radially less than about 1.25 inches from the toothed portion.

11. The method of claim 1, wherein said shaping step includes drawing the piece of material into the generally ring-shaped part such that the ring-shaped part has a centrally-located hole.

* * * * *